(12) United States Patent
Kido

(10) Patent No.: US 9,188,972 B2
(45) Date of Patent: Nov. 17, 2015

(54) NUMERICAL CONTROL APPARATUS HAVING VIBRATION SUPPRESSION CAPABILITIES

(75) Inventor: Syunji Kido, Aichi (JP)

(73) Assignee: OKUMA Corporation, Aichi (JP)

( * ) Notice: Subject to any disclaimer, the term of this patent is extended or adjusted under 35 U.S.C. 154(b) by 767 days.

(21) Appl. No.: 13/368,499

(22) Filed: Feb. 8, 2012

(65) Prior Publication Data

US 2012/0221139 A1 Aug. 30, 2012

(30) Foreign Application Priority Data

Feb. 24, 2011 (JP) ................................ 2011-037799

(51) Int. Cl.
*G06F 19/00* (2011.01)
*G05B 19/404* (2006.01)
*G05B 19/416* (2006.01)

(52) U.S. Cl.
CPC .......... *G05B 19/404* (2013.01); *G05B 19/4163* (2013.01); *G05B 2219/41256* (2013.01); *G05B 2219/49107* (2013.01); *G05B 2219/49176* (2013.01)

(58) Field of Classification Search
CPC ............. G05B 19/404; G05B 19/4163; G05B 2219/49176; G05B 2219/49107; G05B 2219/41256
USPC ................................................. 700/280, 159
See application file for complete search history.

(56) References Cited

U.S. PATENT DOCUMENTS 4,408,280 A * 10/1983 Bedini et al. ................... 700/173
5,203,178 A * 4/1993 Shyu ............................... 62/180
5,719,138 A * 2/1998 Thomas et al. ................ 514/184
6,239,567 B1 * 5/2001 Sunaga et al. ................. 318/432
6,662,073 B1 * 12/2003 Fujishima et al. ............ 700/173
6,748,300 B2 * 6/2004 Sato .............................. 700/304
7,381,017 B2 * 6/2008 Wang et al. ................... 409/131

(Continued)

FOREIGN PATENT DOCUMENTS

JP 2009-101495 A 5/2009

OTHER PUBLICATIONS

Kalinksi, "Computer Simulation of Vibration Surveillance of Discretely Idealised Mechanical Systems. Part II: Tool-Workpiece Vibration in a Non-Stationary Model of the Cutting Process", 2004, pp. 89-101.*

(Continued)

*Primary Examiner* — Kenneth M Lo
*Assistant Examiner* — Olvin Lopez Alvarez
(74) *Attorney, Agent, or Firm* — Osha Liang LLP

(57) ABSTRACT

A numerical control apparatus includes a program analyzing unit 19 that extracts a command rotational speed of a rotary shaft from a machining program, an optimum rotational speed recording unit 16 that stores a plurality of optimum rotational speeds that are suitable to suppress chattering vibrations, and a command rotational speed substitutability determination unit 17. The command rotational speed substitutability determination unit obtains a substitute rotational speed range that represents a range of a substitutable optimum rotational speed based on the command rotational speed extracted from the machining program, and selects an optimum rotational speed from among the plurality of optimum rotational speeds stored in the optimum rotational speed recording unit, which falls within the substitute rotational speed range, as a command rotational speed to be actually used in processing.

3 Claims, 4 Drawing Sheets

(56) References Cited

U.S. PATENT DOCUMENTS

| | | | |
|---|---|---|---|
| 7,565,226 B1* | 7/2009 | Cooley et al. | 700/280 |
| 7,778,716 B2* | 8/2010 | Ueda et al. | 700/63 |
| 7,877,167 B1* | 1/2011 | Patel et al. | 700/280 |
| 8,504,209 B2* | 8/2013 | Gross et al. | 700/280 |
| 8,700,201 B2* | 4/2014 | Yoshino et al. | 700/174 |
| 8,862,429 B2* | 10/2014 | Ando et al. | 702/145 |
| 2008/0310967 A1* | 12/2008 | Franz et al. | 417/32 |
| 2009/0110499 A1 | 4/2009 | Inagaki | |
| 2011/0135415 A1* | 6/2011 | Hamaguchi et al. | 409/79 |
| 2012/0093598 A1* | 4/2012 | Ando et al. | 408/16 |
| 2012/0093603 A1* | 4/2012 | Ueno | 409/79 |

OTHER PUBLICATIONS

Al-Regib et al, "Programming spindle speed variation for machine tool chatter suppression", 2003, pp. 1229-1240.*

Seguy et al, "Chatter control by spindle speed variation in high-speed milling", Sep. 2009, pp. 1-10.*

Zelinslki, "Chatter Control for the Rest of Us", Oct. 2005, pp. 7.*

Federal register, "Federal register Notices", Feb. 9, 2011, pp. 7162-7175.*

Abstract of JP 2009-101495 (a), dated May 14, 2009, downloaded from the Espacenet Worldwide Database, 1 page.

* cited by examiner

| COMMAND ROTATIONAL SPEED | OPTIMUM ROTATIONAL SPEED |
|---|---|
| 1000 | 1056 |
| 2000 | 1988 |
| 3000 | 3014 |
| ⋮ | ⋮ |

FIG. 5

NUMERICAL CONTROL APPARATUS HAVING VIBRATION SUPPRESSION CAPABILITIES

PRIORITY INFORMATION

This application claims priority to Japanese Patent Application No. 2011-037799, filed on Feb. 24, 2011, which is incorporated herein by reference in its entirety.

BACKGROUND

1. Technical Field

The present invention relates to a numerical control apparatus that can control a machine tool. More specifically, the present invention relates to a numerical control apparatus that has a vibration suppression function capable of suppressing chattering vibrations that may occur when a tool or a workpiece rotates about a rotational center thereof to process the workpiece.

2. Related Art

For example, a widely known conventional machine tool includes a rotary shaft that can support a tool and move the tool relative to a fixed workpiece to perform cutting along a circumference surface of the workpiece. In the cutting process of the machine tool, if the depth of cut or the protrusion length of the tool is excessively large, so-called "chattering vibrations" occur during the course of processing and deteriorate the finishing accuracy of a surface to be processed.

In this case, a method capable of suppressing the "chattering vibrations" is conventionally known. The conventional method includes obtaining a natural frequency of a system (e.g., a tool or a workpiece) in which the "chattering vibrations" may occur or a chattering frequency arising during the course of processing. The method further includes multiplying the obtained frequency (i.e., the natural frequency or the chattering frequency) by 60 and dividing the calculated value by the number of tool flutes and a predetermined integer to determine a target rotational speed to be used in the processing. There is a conventional vibration suppression apparatus capable of obtaining an optimum rotational speed at which the "chattering vibrations" can be effectively suppressed.

For example, as discussed in JP 2009-101495 A, a machine tool has a rotary shaft that causes a tool or a workpiece to rotate about a rotational center thereof and the machine tool is equipped with a vibration suppression apparatus capable of suppressing chattering vibrations that may occur when the rotary shaft is rotating. The vibration suppression apparatus includes a detection unit that detects a time domain vibration of the rotary shaft while the rotary shaft is rotating, a first calculation unit that calculates a chatter frequency and a frequency domain vibration of the chatter frequency based on the time domain vibration detected by the detection unit, and a storage unit that stores machining information including the frequency domain vibration, the chatter frequency, and a rotary shaft rotational speed.

If the frequency domain vibration calculated by the first calculation unit exceeds a predetermined threshold, a second calculation unit acquires new machining information including a frequency domain vibration, a chatter frequency, and a rotary shaft rotational speed at this moment, and stores the acquired new machining information in the storage unit. The second calculation unit calculates an optimum rotational speed of the rotary shaft that can suppress chattering vibrations, by reference to the new machining information and the past machining information stored in the storage unit. The vibration suppression apparatus further includes a rotational speed control unit that causes the rotary shaft to rotate about a rotational center thereof at the optimum rotational speed calculated by the second calculation unit.

Further, in the conventional vibration suppression apparatus, the optimum rotational speed calculated in this manner is recorded in an optimum rotational speed recording unit together with a tool number of the tool supported on the rotary shaft when the optimum rotational speed is calculated and a command rotational speed of the rotary shaft included in a machining program.

Thus, when the processing is performed again by means of a tool having the same tool number and at a command rotational speed identical to that in the optimum rotational speed calculation, it is feasible to perform the processing at the previously calculated optimum rotational speed (a substitute for the command rotational speed) recorded together with the command rotational speed. However, even if the tool having the same tool number and the recorded optimum rotational speed are used, the "chattering vibrations" may fail to be suppressed sufficiently, because the cutting resistance acting on the tool varies due to, for example, abrasion of the tool.

In general, only one optimum rotational speed exists within a corresponding rotational speed range. Therefore, in a case where the processing is performed by means of the same tool at a plurality of command rotational speeds, if all of the plurality of command rotational speeds fall within only one type of rotational speed range, only one optimum rotational speed exists.

On the other hand, if the plurality of command rotational speeds fall within a plurality of types of rotational speed ranges, a respective optimum rotational speed exists within each of the plurality of types of rotational speed ranges. More specifically, in each tool, a plurality of types of optimum rotational speeds are recorded for a plurality of command rotational speeds. The number of the types of the optimum rotational speeds is different from the number of types of the command rotational speeds.

A conventional method for substituting a command rotational speed designated in the machining program by an optimum rotational speed, to perform processing at the optimum rotational speed recorded in the above-described manner, is described in detail below.

FIG. 1 is a block diagram illustrating an example of a numerical control apparatus that includes a conventional vibration suppression function. In FIG. 1, a program analyzing unit 19 extracts a command rotational speed CMD-S from a machining program 18 to cause a rotary shaft 10 holding a tool 11 to rotate about a rotational center thereof. The program analyzing unit 19 supplies the extracted command rotational speed CMD-S to a command rotational speed substitutability determination unit 17. Further, the command rotational speed substitutability determination unit 17 receives an optimum rotational speed LOG-S from an optimum rotational speed recording unit 16.

The command rotational speed substitutability determination unit 17 determines whether the command rotational speed CMD-S can be substituted by the optimum rotational speed LOG-S. If it is determined that the command rotational speed CMD-S can be substituted by the optimum rotational speed LOG-S, the command rotational speed substitutability determination unit 17 supplies the optimum rotational speed LOG-S, as a command rotational speed CMD-S', to a rotational speed control unit 15.

Next, a method for determining whether the command rotational speed can be substituted by the optimum rotational speed is described below. FIG. 3 is a flowchart illustrating an operation that can be performed by the conventional command rotational speed substitutability determination unit 17.

In FIG. 3, in step S1, the command rotational speed substitutability determination unit 17 sets an initial value "0" for the command rotational speed CMD-S' to be output to the rotational speed control unit 15. Next, in step S3, the command rotational speed substitutability determination unit 17 compares the command rotational speed CMD-S extracted by the program analyzing unit 19 with a command rotational speed (hereinafter, referred to as "corresponding rotational speed") associated with the optimum rotational speed LOG-S recorded in the optimum rotational speed recording unit 16.

In the present example, the corresponding rotational speed is a command rotational speed at timing when the optimum rotational speed LOG-S is calculated. If, as a result of the comparison, it is determined that the command rotational speed CMD-S coincides with the corresponding rotational speed, then in step S4, the command rotational speed substitutability determination unit 17 sets the recorded optimum rotational speed LOG-S (i.e., the optimum rotational speed that corresponds to the corresponding rotational speed) as the command rotational speed CMD-S'.

In the present example, the optimum rotational speed recording unit 16 stores a plurality of optimum rotational speeds. Therefore, in step S2, the command rotational speed substitutability determination unit 17 confirms whether the processing of step S3 and step S4 has been completed for each optimum rotational speed LOG-S recorded in the optimum rotational speed recording unit 16.

In step S5, the command rotational speed substitutability determination unit 17 confirms whether the command rotational speed CMD-S' to be output to the rotational speed control unit 15 is the initial value "0" at timing when the confirmation processing has been completed for all of the optimum rotational speeds LOG-S recorded in the optimum rotational speed recording unit 16.

If it is determined that the command rotational speed CMD-S' is equal to the initial value "0", then in step S6, the command rotational speed substitutability determination unit 17 sets the command rotational speed CMD-S designated in the program as the command rotational speed CMD-S' to be output to the rotational speed control unit 15. Then, in step S7, the command rotational speed substitutability determination unit 17 determines that the command rotational speed is not substitutable.

If in step S5 it is determined that the command rotational speed CMD-S' to be output to the rotational speed control unit 15 is not the initial value "0", then in step S8, the command rotational speed substitutability determination unit 17 determines that the command rotational speed is substitutable, because the recorded optimum rotational speed LOG-S is set as the command rotational speed CMD-S' to be output to the rotational speed control unit 15.

According to the above-described conventional command rotational speed substitutability determination, although only one optimum rotational speed is present within a rotational speed range, the command rotational speed is substituted by an optimum rotational speed corresponding to the corresponding rotational speed only when a command rotational speed of the machining program coincides with the corresponding rotational speed recorded in the optimum rotational speed recording unit.

In other words, if the command rotational speed designated in the machining program is slightly different from the recorded corresponding rotational speed, the numerical control apparatus does not perform substitution processing. As a result, the recorded optimum rotational speed cannot be used.

Therefore, even in a case where a plurality of corresponding rotational speeds are stored in the optimum rotational speed recording unit, the recorded optimum rotational speeds cannot be used for various command rotational speeds (e.g., command rotational speeds having not yet been used). Then, if the machining program designates a command rotational speed that is different from the previously used value, the numerical control apparatus cannot substitute an optimum rotational speed for the command rotational speed even when the same tool is used to perform processing. As a result, chattering vibrations may occur. In this case, the finishing accuracy of a surface to be processed deteriorates significantly.

Hence, the present invention intends to provide a numerical control apparatus that can suppress chattering vibrations effectively.

SUMMARY

A numerical control apparatus according to the present invention is mounted on a machine tool having a rotary shaft that rotates a tool and is configured to control driving of the machine tool according to a machining program. The numerical control apparatus includes a program analyzing unit configured to analyze the machining program and extract a command rotational speed of the rotary shaft based on an analysis result of the machining program; an optimum rotational speed recording unit configured to record a plurality of optimum rotational speeds that are suitable to suppress chattering vibrations; and a command rotational speed substitutability determination unit configured to select one optimum rotational speed from among the plurality of optimum rotational speeds stored in the optimum rotational speed recording unit, as a command rotational speed to be actually used in processing, with reference to the command rotational speed extracted from the machining program. The command rotational speed substitutability determination unit obtains a substitute rotational speed range that represents a range of a substitutable optimum rotational speed based on the command rotational speed extracted from the machining program, and selects an optimum rotational speed from among the plurality of optimum rotational speeds stored in the optimum rotational speed recording unit, which falls within the substitute rotational speed range, as the command rotational speed to be actual used in processing.

In a preferred embodiment, the command rotational speed substitutability determination unit calculates an upper-limit value or a lower-limit value of the substitute rotational speed range by multiplying the command rotational speed extracted from the machining program by an upper-limit rate or a lower-limit rate regulated beforehand.

In another preferred embodiment, the command rotational speed substitutability determination unit selects, as the command rotational speed to be actually used in processing, an optimum rotational speed that is smallest in absolute value of a difference relative to the command rotational speed extracted from the machining program, if a plurality of optimum rotational speeds of the plurality of optimum rotational speeds stored in the optimum rotational speed recording unit fall within the substitute rotational speed range.

According to the present invention, the numerical control apparatus selects an optimum rotational speed to be substituted for the command rotational speed based on the substitute rotational speed range having a predetermined width. Therefore, it becomes feasible to substitute any command rotational speed (e.g., a command rotational speed having not yet been used) for an optimum rotational speed. As a result, it is feasible to perform processing at an appropriate rotational speed where no chattering vibration occurs. Further, if a plurality of optimum rotational speeds do not fall within the setting range, these optimum rotational speeds are excluded from the candidates for the substitutable optimum rotational speed. Therefore, it is feasible to provide a numerical control apparatus that is stably usable to suppress vibrations while preventing the rotational speed of the rotary shaft from increasing or decreasing rapidly.

BRIEF DESCRIPTION OF THE DRAWINGS

FIG. 5 illustrates an example of data stored in an optimum rotational speed recording unit.

DETAILED DESCRIPTION

An embodiment of the present invention is described in detail below with reference to the attached drawings.

Figure 1:
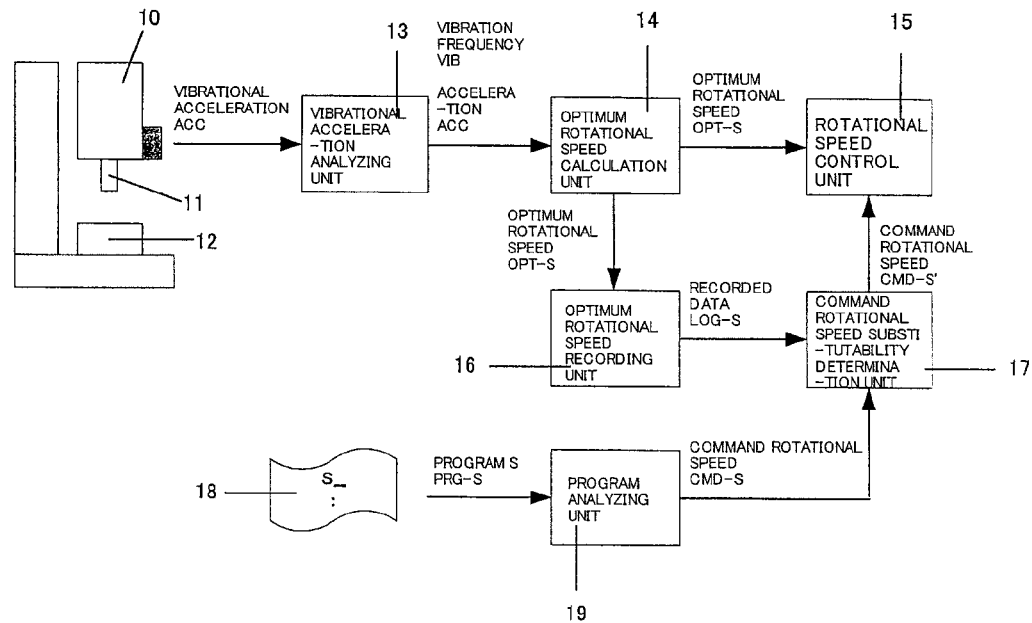
FIG. 1 is a block diagram illustrating an example of a conventional numerical control apparatus.
Figure 2:
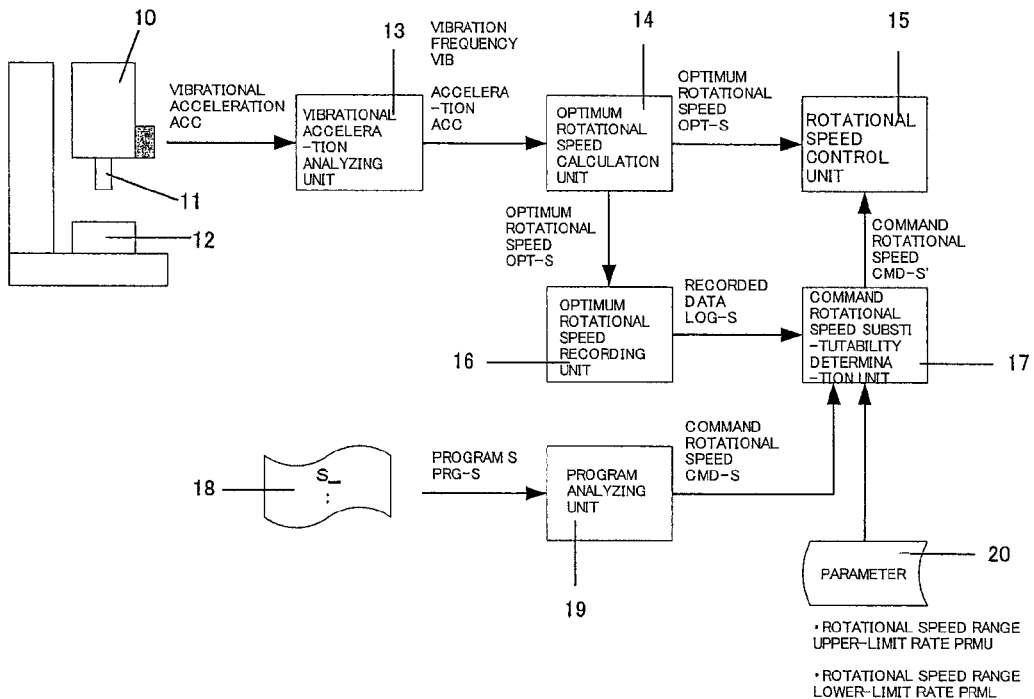
FIG. 2 is a block diagram illustrating a numerical control apparatus according to an embodiment of the present invention.
Figure 3:
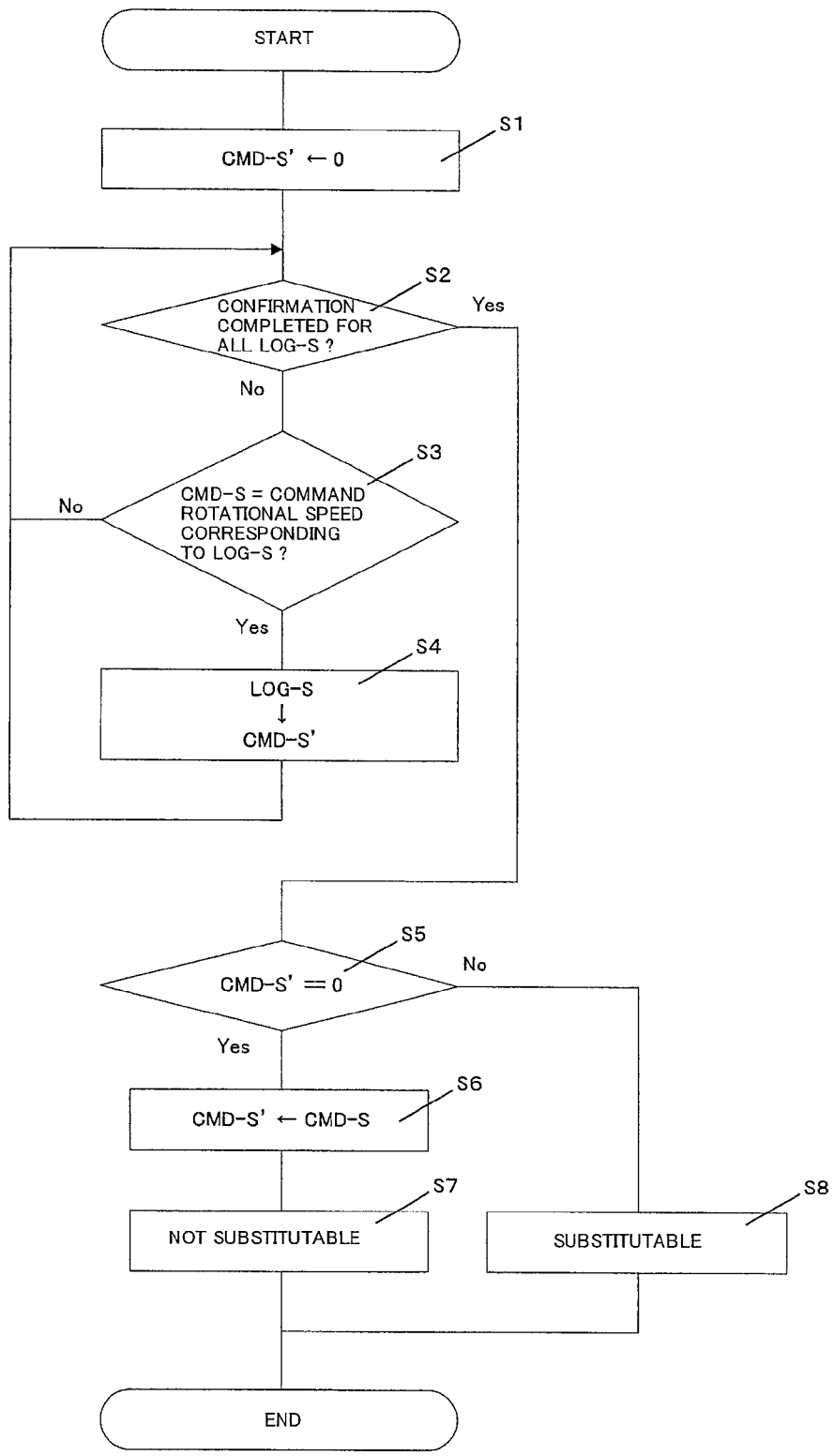
FIG. 3 is a flowchart illustrating an operation that can be performed by a conventional command rotational speed substitutability determination unit.

FIG. 2 is a block diagram illustrating a numerical control apparatus that has a vibration suppression function according to an embodiment of the present invention. In the numerical control apparatus illustrated in FIG. 2, a program analyzing unit 19 extracts a command rotational speed CMD-S from a machining program 18 to cause a rotary shaft 10 holding a tool 11 to rotate about a rotational center thereof. The program analyzing unit 19 supplies the extracted command rotational speed CMD-S to a command rotational speed substitutability determination unit 17. Further, the command rotational speed substitutability determination unit 17 receives an optimum rotational speed LOG-S from an optimum rotational speed recording unit 16.

Further, in the present embodiment, predetermined setting values (i.e., a rotational speed range upper-limit rate PRMU and a rotational speed range lower-limit rate PRML) of an arbitrary parameter 20 are input to the command rotational speed substitutability determination unit 17.

The command rotational speed substitutability determination unit 17 calculates a range of a substitutable optimum rotational speed LOG-S (hereinafter, referred to as "substitute rotational speed range") based on the extracted command rotational speed CMD-S and the input setting values (i.e., the rotational speed range upper-limit rate PRMU and the rotational speed range lower-limit rate PRML) according to the following formula 1.

$$(CMD\text{-}S \times PRML) \leq LOG\text{-}S \leq (CMD\text{-}S \times PRMU) \quad \text{formula 1}$$

The command rotational speed substitutability determination unit 17 determines whether any one of the recorded optimum rotational speeds LOG-S falls within the substitute rotational speed range. If it is determined that at least one recorded optimum rotational speed LOG-S falls within the substitute rotational speed range, the command rotational speed substitutability determination unit 17 selects an optimum rotational speed closest to the command rotational speed CMD-S, from among the optimum rotational speeds falling within the substitute rotational speed range. The command rotational speed substitutability determination unit 17 outputs the selected optimum rotational speed, as a command rotational speed CMD-S', to a rotational speed control unit 15.

On the other hand, if no optimum rotational speed LOG-S falls within the substitute rotational speed range, the command rotational speed substitutability determination unit 17 outputs to the rotational speed control unit 15 the command rotational speed CMD-S designated in the machining program, as the command rotational speed CMD-S'.

Figure 4:
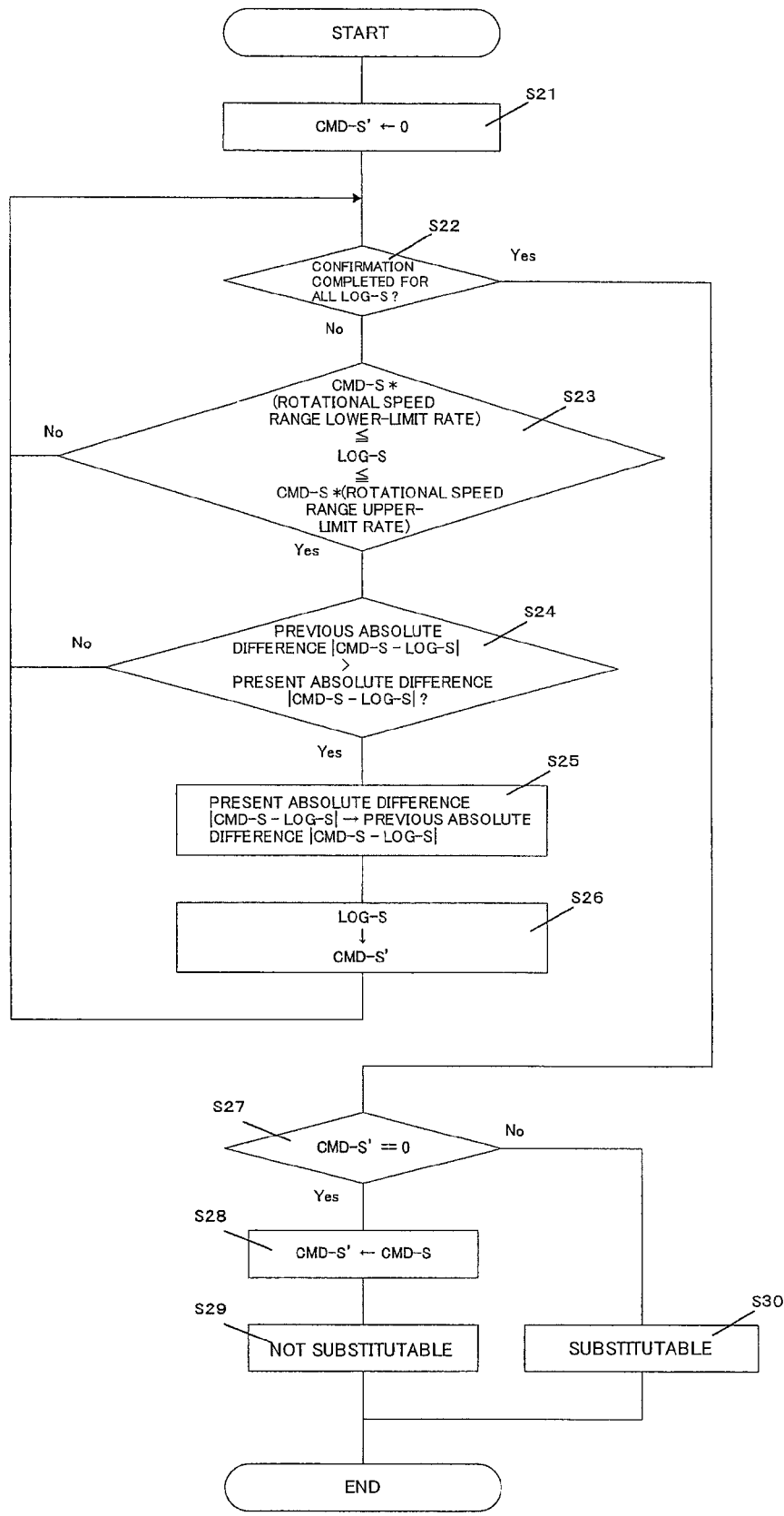
FIG. 4 is a flowchart illustrating an operation that can be performed by a command rotational speed substitutability determination unit according to an embodiment of the present invention.

Next, a method for determining whether the command rotational speed CMD-S can be substituted by the recorded optimum rotational speed LOG-S is described below with reference to FIG. 4. FIG. 4 is a flowchart illustrating an operation that can be performed by the command rotational speed substitutability determination unit 17 according to the present embodiment. In FIG. 4, first, in step S21, the command rotational speed substitutability determination unit 17 sets an initial value "0" for the command rotational speed CMD-S' to be output to the rotational speed control unit 15.

Next, in step S23, the command rotational speed substitutability determination unit 17 determines whether the optimum rotational speed recording unit 16 stores at least one optimum rotational speed LOG-S that falls within the substitute rotational speed range calculated based on the above-described formula 1. If it is determined that no optimum rotational speed LOG-S falls within the substitute rotational speed range (No in step S23), the processing returns to step S22.

In step S22, the command rotational speed substitutability determination unit 17 determines whether the determination processing of step S23 has been completed for all of the recorded optimum rotational speeds LOG-S. If it is determined that there is at least one remaining optimum rotational speed LOG-S that has not yet been subjected to the determination processing of step S23, the command rotational speed substitutability determination unit 17 performs the determination processing of step S23 for one of the remaining optimum rotational speeds LOG-S. If it is determined that there is not any remaining optimum rotational speed LOG-S, the processing proceeds to step S27.

In step S23, if it is determined that the target optimum rotational speed LOG-S falls within the substitute rotational speed range (Yes in step S23), the processing proceeds to step S24. In step S24, the command rotational speed substitutability determination unit 17 calculates a difference between each of the target optimum rotational speeds LOG-S and the command rotational speed CMD-S to identify the optimum rotational speed LOG-S that is closest to the command rotational speed CMD-S.

Then, in step S24, the command rotational speed substitutability determination unit 17 compares a previous absolute difference |CMD-S−LOG-S| (i.e., a difference between the previous optimum rotational speed LOG-S and the command rotational speed CMD-S) with a present absolute difference |CMD-S−LOG-S| (i.e., a difference between the optimum rotational speed LOG-S to be confirmed presently and the command rotational speed CMD-S).

If it is determined that the present absolute difference |CMD-S−LOG-S|) is smaller than the previous absolute difference |CMD-S−LOG-S| (Yes in step S24), then in step S25, the command rotational speed substitutability determination unit 17 updates the difference between the optimum rotational speed LOG-S closest to the command rotational speed CMD-S and the command rotational speed CMD-S while regarding the value of the "present absolute difference |CMD-S−LOG-S|" as the value of the "previous absolute difference |CMD-S−LOG-S|."

Then, in step S26, the command rotational speed substitutability determination unit 17 sets the present optimum rotational speed LOG-S as the command rotational speed CMD-S' to be output to the rotational speed control unit 15.

In step S22, the command rotational speed substitutability determination unit 17 confirms that the above-described processing has been completed for each of the recorded plurality of optimum rotational speeds LOG-S. At this moment, if the command rotational speed CMD-S' to be output to the rotational speed control unit 15 is equal to the initial value "0" (Yes in step S27), then in step S28, the command rotational speed substitutability determination unit 17 sets the command rotational speed CMD-S designated in the machining program as the command rotational speed CMD-S' to be output to the rotational speed control unit 15.

Then, in step S29, the command rotational speed substitutability determination unit 17 determines that the command rotational speed is not substitutable. If the command rotational speed CMD-S' to be output to the rotational speed control unit 15 is not equal to the initial value "0" (No in step S27), then in step S30, the command rotational speed substitutability determination unit 17 determines that the command rotational speed is substitutable, because the optimum rotational speed LOG-S closest to the command rotational speed CMD-S is already set as the command rotational speed CMD-S' to be output to the rotational speed control unit 15.

An example of substitution rotational speed range calculation is described below. FIG. 5 is a table illustrating an example of the data stored in the optimum rotational speed recording unit 16. The table illustrated in FIG. 5 includes a plurality of command rotational speeds in relation to corresponding optimum rotational speeds, which are set for a predetermined tool number.

For example, it is presumed that the rotational speed range lower-limit rate is set to be 0.7 (i.e., PRML=0.7) and the rotational speed range upper-limit rate is set to be 1.4 (i.e., PRMU=1.4) as the setting values of the arbitrary parameter 20. Further, it is presumed that the command rotational speed extracted from the machining program at this time is 1500 (i.e., CMD-S=1500). In this state, the range of the substitutable optimum rotational speed can be calculated according to the following formula 1.

$$1500 \times 0.7 \leq \text{optimum rotational speed LOG-}S \leq 1500 \times 1.4$$

$$1050 \leq \text{optimum rotational speed LOG-}S \leq 2100$$

Thus, the substitute rotational speed range is equal to or greater than 1050 and is equal to or less than 2100. The obtained substitute rotational speed range includes two optimum rotational speeds "1056" and "1988" from among the recorded plurality of optimum rotational speeds illustrated in FIG. 5. These two rotational speeds "1056" and "1988" can be regarded as substitutable optimum rotational speeds, and the remaining optimum rotational speed "3014" is excluded from the candidates for the substitutable optimum rotational speed.

Next, a processing flow for identifying an optimum rotational speed LOG-S to be substituted based on the substitute rotational speed range is described in detail below. First, in step S23, the command rotational speed substitutability determination unit 17 determines whether the optimum rotational speed "1056" (i.e., one of the plurality of optimum rotational speeds stored in the optimum rotational speed recording unit 16) falls within the substitute rotational speed range.

The above-described substitute rotational speed range is equal to or greater than 1050 and is equal to or less than 2100. Therefore, the optimum rotational speed "1056" falls within the substitutable range (Yes in step S23). Next, in step S24, the command rotational speed substitutability determination unit 17 calculates a difference between the command rotational speed CMD-S and the optimum rotational speed LOG-S. In this case, the command rotational speed is 1500 (i.e., CMD-S=1500). Therefore, the present absolute difference |CMD-S−LOG-S| is equal to 444 (=|1500−1056|).

Further, as the command rotational speed substitutability determination unit 17 performs the processing for the first time, the previous optimum rotational speed is regarded as 0 (i.e., LOG-S="0"). Thus, the previous absolute difference |CMD-S−LOG-S| is equal to 1500 (=|1500−0|). The condition that the previous absolute difference (=1500)>the present absolute difference (=444) is satisfied in this case. Therefore, the determination result in step S24 becomes YES.

Next, the processing proceeds to step S25. In step S25, the command rotational speed substitutability determination unit 17 substitutes the present absolute difference for the previous absolute difference. Thus, the previous absolute difference changes from 1500 to 444. Then, the processing proceeds to step S26. In step S26, the command rotational speed substitutability determination unit 17 sets the optimum rotational speed LOG-S as the command rotational speed CMD-S' to be output to the rotational speed control unit 15 (namely, CMD-S'=1056). Then, the processing returns to step S22.

In step S22, the command rotational speed substitutability determination unit 17 confirms the presence of any other optimum rotational speed LOG-S that has not yet been subjected to the confirmation processing in step S23. In the present example, a plurality of optimum rotational speeds (e.g., "1988", "3014", . . . ) remain as the optimum rotational speeds LOG-S not yet having been subjected to the confirmation processing in step S23. Therefore, the command rotational speed substitutability determination unit 17 sequentially performs the confirmation processing for each remaining optimum rotational speed LOG-S. More specifically, at the present time, the command rotational speed substitutability determination unit 17 performs the confirmation processing for the optimum rotational speed LOG-S "1988."

In step S23, the command rotational speed substitutability determination unit 17 confirms that the optimum rotational speed LOG-S "1988" falls within the substitute rotational speed range. Next, in step S24, the command rotational speed substitutability determination unit 17 calculates a difference between the command rotational speed CMD-S and the optimum rotational speed LOG-S, in the same manner as the previous processing.

In this case, the command rotational speed CMD-S is equal to 1500. Therefore, in the present processing, the present absolute difference |CMD-S−LOG-S| is equal to 488 (=|1500−1988|). The condition that the previous absolute difference (=444)>the present absolute difference (=488) is not satisfied. Then, the processing returns to step S22. In other words, as the present absolute difference is greater than the previous absolute difference, the presently processed optimum rotational speed LOG-S (=1988) does not satisfy the condition that the command rotational speed substitutability determination unit 17 selects the optimum rotational speed closest to the command rotational speed. Accordingly, the command rotational speed substitutability determination unit 17 does not select the present optimum rotational speed LOG-S (=1988).

Next, the command rotational speed substitutability determination unit 17 performs the confirmation processing for the optimum rotational speed LOG-S "3014." In step S23, the command rotational speed substitutability determination unit 17 confirms that the optimum rotational speed LOG-S "3014" does not fall within the substitute rotational speed range. Therefore, the processing returns to step S22. The command rotational speed substitutability determination unit 17 repeats the processing similarly for all of the recorded optimum rotational speeds illustrated in FIG. 5. After the confirmation processing is completed for all of the recorded optimum rotational speeds, the processing proceeds to step S27.

In the present example, the command rotational speed CMD-S' to be output to the rotational speed control unit 15 is "1056." Accordingly, in step S27, the command rotational speed CMD-S' is not "0" and therefore the processing proceeds to step S30. In step S30, the command rotational speed substitutability determination unit 17 determines that the command rotational speed is substitutable. Then, the command rotational speed substitutability determination unit 17 terminates the processing of the flowchart illustrated in FIG. 4. Then, in the actual processing, the substituted optimum rotational speed "1056" can be used as the command rotational speed CMD-S' to control the machine tool. Thus, the numerical control apparatus can effectively suppress chattering vibrations to realize desired processing.

In the present embodiment, each optimum rotational speed calculated by an optimum rotational speed calculation unit 14 mounted on the numerical control apparatus is stored in the optimum rotational speed recording unit 16. Alternatively, if any optimum rotational speed has been obtained previously by experiment, it is useful to store the experimentally obtained data in the optimum rotational speed recording unit 16.

Further, an essentially requirement is that the optimum rotational speed recording unit 16 stores at least one optimum rotational speed. Therefore, if it is unnecessary, a command rotational speed associated with each optimum rotational speed (i.e., the corresponding rotational speed, which is the parameter recorded in the left column of the table illustrated in FIG. 5) can be omitted.

Further, in the above-described embodiment, the numerical control apparatus calculates a range of the substitutable optimum rotational speed (i.e., the substitute rotational speed range) and obtains an optimum rotational speed falling within the substitute rotational speed range. If the selected optimum rotational speed falls within a predetermined range obtainable from the command rotational speed designated in the machining program, it is useful to determine an optimum rotational speed to be substituted for the command rotational speed in another flow of the processing. For example, it is useful to divide each optimum rotational speed recorded in the recording unit 16 by the command rotational speed designated in the machining program and determine whether the obtained value falls within a range defined by a lower-limit rate and an upper-limit rate having been regulated beforehand.

What is claimed is:

1. A numerical control apparatus that is mounted on a machine tool having a rotary shaft that rotates a tool and is configured to control driving of the machine tool according to a machining program, the numerical control apparatus comprising:
a program analyzing unit configured to analyze the machining program and extract a command rotational speed of the rotary shaft based on an analysis result of the machining program;
an optimum rotational speed recording unit configured to store a plurality of optimum rotational speeds that are suitable to suppress chattering vibrations;
a command rotational speed substitutability determination unit configured to select one optimum rotational speed from among the plurality of optimum rotational speeds stored in the optimum rotational speed recording unit, as a command rotational speed to be actually used in processing, with reference to the command rotational speed extracted from the machining program, and
a processor executing each of the units,
wherein the command rotational speed substitutability determination unit obtains a substitute rotational speed range that represents a range in which the command rotational speed can be substituted with the optimum rotational speed based on the command rotational speed extracted from the machining program, and selects an optimum rotational speed from among the plurality of optimum rotational speeds stored in the optimum rotational speed recording unit, which falls within the substitute rotational speed range, as a command rotational speed to be actually used in processing,
wherein the substituted rotational speed range is a range including the command rotational speed and which changes according to the command rotational speed.

2. The numerical control apparatus according to claim 1, wherein the command rotational speed substitutability determination unit calculates an upper-limit value or a lower-limit value of the substitute rotational speed range by multiplying the command rotational speed extracted from the machining program by an upper-limit rate or a lower-limit rate regulated beforehand.

3. The numerical control apparatus according to claim 1, wherein the command rotational speed substitutability determination unit selects, as the command rotational speed to be actually used in processing, an optimum rotational speed that is smallest in absolute value of a difference relative to the command rotational speed extracted from the machining program, if a plurality of optimum rotational speeds of the plurality of optimum rotational speeds stored in the optimum rotational speed recording unit fall within the substitute rotational speed range.

* * * * *